No. 884,892. PATENTED APR. 14, 1908.
F. BRINGK.
RECEPTACLE FOR PRESERVING FISH AND OTHER ALIMENTARY SUBSTANCES.
APPLICATION FILED MAR. 25, 1907.
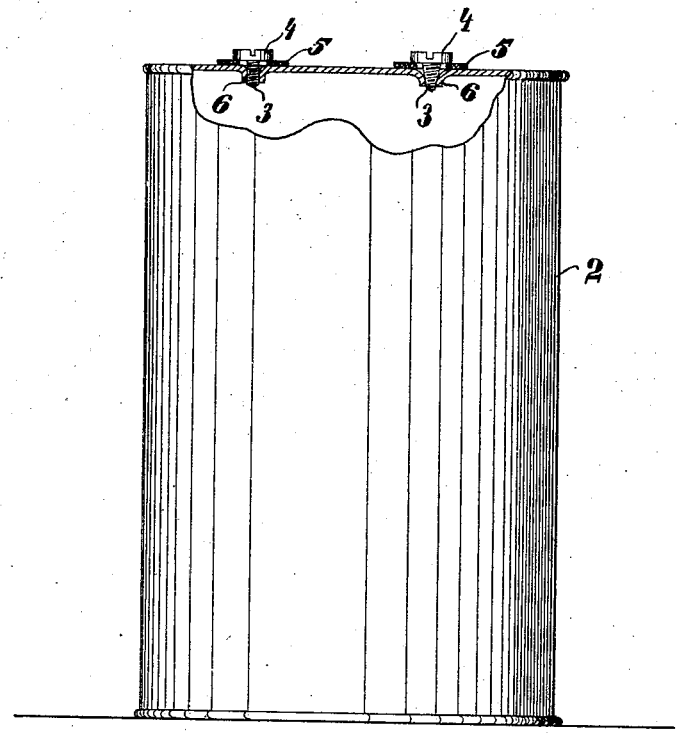
Witnesses
F. J. Veihmeyer
V. E. Burner
Inventor.
Friedrich Bringk.
By Edsen Bros.
Attorneys

UNITED STATES PATENT OFFICE.

FRIEDRICH BRINGK, OF GEESTEMÜNDE, GERMANY.

RECEPTACLE FOR PRESERVING FISH AND OTHER ALIMENTARY SUBSTANCES.

No. 884,892.  Specification of Letters Patent.  Patented April 14, 1908.

Application filed March 25, 1907. Serial No. 364,210.

*To all whom it may concern:*

Be it known that I, FRIEDRICH BRINGK, a subject of the King of Prussia, German Emperor, residing at Geestemünde, Province of Hanover, Kingdom of Prussia, German Empire, Bremerstrasse 1, have invented new and useful Improvements in Receptacles for Preserving Fish and other Alimentary Substances, of which the following is a specification.

In Germany the fishing industry has latterly been carried on by means of large steamers, and is no longer confined to the North Sea, but also extends to the Icelandic waters, where the catches are extremely large, so that it frequently happens that one or more cargoes of these steam trawlers amounting to from 75 to 100 tons of fresh fish, and particularly Icelandic fish are suddenly placed upon the market. Such large supplies are, however, almost unsalable in the summer, when the temperature is high, because they will not keep. As a result, with such large catches the price falls exceedingly low, even to half a pfennig per lb., so that the proceeds frequently do not cover the expenses, and it has even happened, that such large catches of fish could only be used as manure.

Under these circumstances it was an obvious step to employ for fish the method of storing in tin boxes which is also used for preserving other alimentary substances. Experience has demonstrated however, that it is impossible to obtain a germ-free, that is to say a permanent preservation of fish, by means of the process heretofore employed. Experiments have shown, that this defect was due to the manner in which the boxes were reclosed after the cooking. Heretofore, the goods have been cooked in the closed boxes, a small opening being made in the box for the escape of the air, which opening was re-closed by a bead of solder. When this method is adopted, it is impossible to avoid the penetration of germs into the interior of the box before the soldering takes place, quite apart from the fact that the boxes were frequently not closed during the cooking as the small aperture was open. The soldering itself cannot be effected as long as any pressure exists inside the box, but must be effected after all pressure has disappeared, and this necessitates a certain cooling of the boxes during which germ-laden air again enters them. The present invention obviates these defects owing to the fact, that the closed boxes containing the goods are first cooked after which an opening is formed to permit of the escape of the air which they contain. The boxes are reclosed before the internal pressure has completely disappeared, and in the heated condition before the air is again given the opportunity to penetrate into the interior of the boxes. By this means, it is possible, to preserve alimentary substance in general, and fish in particular, with certainty and for a long period for human use, and this presents an important industrial advantage, because on the one hand higher prices can be obtained for the entire cargo of a ship, while on the other hand the prices do not rise immoderately, when the supply of fish is poor. It will therefore not be possible for the fish to be used as manure.

In carrying out the invention the fresh alimentary substance, such as fish for example, is cooked packed in soldered tin boxes. After an adequate cooking, a hole is formed in the box to permit the air at high pressure to escape. As soon as water begins to follow, the opening is again closed air-tight by means of a screw provided with an india rubber washer which has been dipped in water and steam proof glue.

In the accompanying drawing is shown a tin which has been opened and closed according to my process.

The details may be described thus: The fresh fish are cleaned, cut into suitable pieces, and when desired packed with salt and seasoning in tin boxes 2, whereupon the lid is soldered on, or otherwise fixed in an air-tight manner. The boxes 2 are then placed in water or steam for cooking and removed therefrom after a certain time, whereupon an opening 3 of 1½ to 2 mm. is formed in the lid, say by means of a stiletto. After the air, which, owing to the cooking has attained a high pressure, has escaped from the box 2, a jet of water will succeed it. Before this ceases to issue, the opening should at once be reclosed that is to say immediately after the opening 3 has been formed a small screw 4 should be inserted, this screw being provided with an india rubber washer 5 and previously dipped in water and steam proof glue.

Although no screw thread is provided, the small tapering tube 6 formed in puncturing the tin 2, and which, to a certain extent serves as screw thread, will be sufficient to retain the screw 4, and this action is assisted by the external pressure arising owing to the cooling.

The screw may be conical or cylindrical. Both forms are shown in the drawing although, of course, only one hole is made in each tin.

A difficulty which arose in carrying the process into practice, was that screws as small as 1½ to 2 mm. in diameter and say 5 mm. long, are difficult to grasp with the fingers, and therefore to insert, especially in view of the fact, that the boxes are still hot; I have therefore adopted the device of employing a magnetic screw-driver for inserting the screws. It is only by this means that it has become possible to close the boxes so quickly that the fingers of the operative are not injured by the heat, nor smeared with glue. This method of closing is entirely reliable.

What I claim as my invention and desire to secure by Letters-Patent is:

1. The combination, with a sheet metal receptacle having a small opening punched therein from without, leaving a tapering tubular inward projection around said opening, of a screw closing said opening with its threaded portion engaging said tubular projection, said screw provided with an india rubber washer coated with glue which is impervious to water and steam.

2. The combination, with a sheet metal receptacle having a small opening punched therein from without, leaving a tapering tubular inward projection around said opening, of a tapered screw closing said opening with its threaded portion engaging said tapering tubular projection, said screw provided with an india rubber washer coated with glue which is impervious to water and steam.

FRIEDRICH BRINGK.

Witnesses:
  T. MERLEST,
  D. LEUTHE.